No. 661,255. Patented Nov. 6, 1900.
W. BELFIELD.
LOCK NUT FOR VEHICLE AXLES.
(Application filed May 26, 1900.)

(No Model.)

Witnesses

Inventor
William Belfield,
By
Attorneys

UNITED STATES PATENT OFFICE.

WILLIAM BELFIELD, OF PLATTEVILLE, ILLINOIS, ASSIGNOR OF THREE-FOURTHS TO ROBERT SHEARER, JOHN FINDLAY, AND GAMALIEL BELFIELD, OF SAME PLACE.

LOCK-NUT FOR VEHICLE-AXLES.

SPECIFICATION forming part of Letters Patent No. 661,255, dated November 6, 1900.

Application filed May 26, 1900. Serial No. 18,107. (No model.)

*To all whom it may concern:*

Be it known that I, WILLIAM BELFIELD, a citizen of the United States, residing at Platteville, in the county of Kendall and State of Illinois, have invented a new and useful Lock-Nut for Vehicle-Axles, of which the following is a specification.

My invention relates to lock-nuts for vehicle-axles; and it has for its object to produce a device of this kind which can be quickly operated and which will prevent the accidental removal of the nut; and it consists in the improved construction and novel arrangement of parts of the same, as will be hereinafter more fully set forth.

Figure 1:
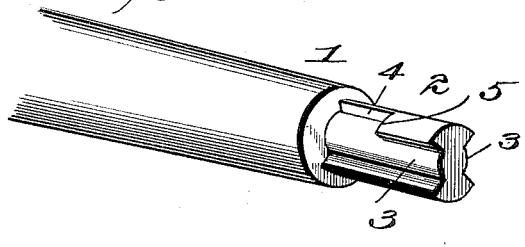
Figure 2:
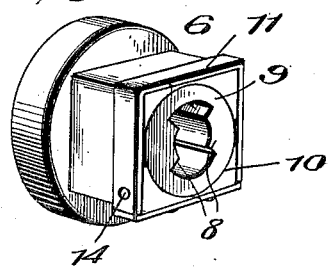
Figure 3:
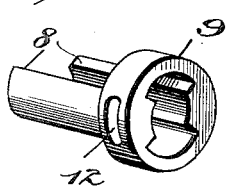
Figure 4:
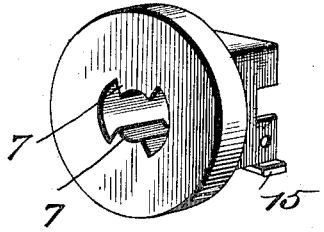
Figure 5:
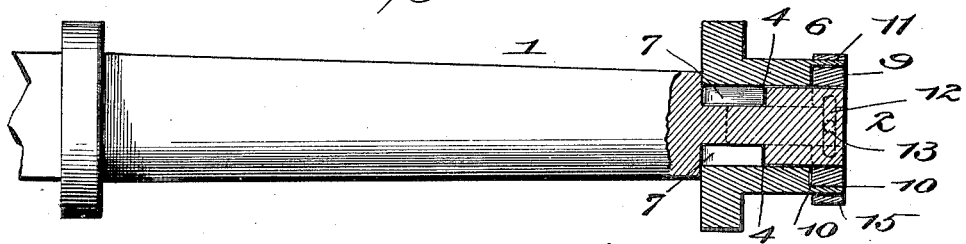
Figure 6:
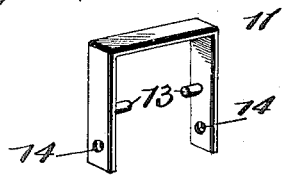
Figure 7:
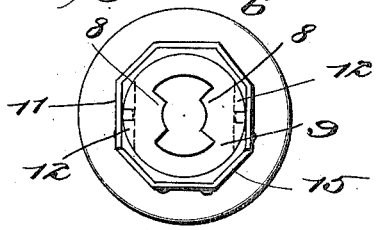

In the accompanying drawings, in which the same reference-numerals indicate corresponding parts in each of the views in which they occur, Figure 1 is a perspective view of one end of an axle adapted to receive my improved lock-nut. Fig. 2 is a perspective sectional view of my improved lock-nut. Fig. 3 is a perspective view of the lock or key for holding the nut in position. Fig. 4 is an end view of the axle and nut. Fig. 5 is a longitudinal sectional view of the same. Fig. 6 is a perspective detail view of the bail for operating the lock; and Fig. 7 is a perspective view of the end of the nut, showing a slight modification in the form of the bail and the hinge.

Referring more particularly to the drawings, 1 indicates the end or spindle of an axle, which may be of any suitable size and construction. The tip or outer end of the spindle is provided with a projection 2, which takes the place of the ordinary screw-threaded projection in vehicles as constructed at present. The projection is provided with oppositely-disposed longitudinal grooves 3, each of which is provided with a laterally-extending recess 4 at its inner end to form a shoulder 5.

Fitting upon the projection is a nut 6, the inner end of the bore of which is provided with two inwardly-projecting lugs 7, which are adapted to be moved into the recesses 4, so as to engage with the shoulders 5 when the nut is partially rotated and prevent the removal of the nut until it has been rotated back into its normal position. The lugs or ribs 7 are substantially of the same area in cross-section as the grooves 3, so that as the nut is slipped back and forth upon the projection the lugs will move within the grooves. After the nut has been placed upon the projection and rotated to prevent its removal two wedges 8 are slipped down into the grooves, which will engage with the sides of the lugs and prevent the rotation of the nut until after the wedges have been withdrawn. The wedges are preferably secured to or formed integral with a collar 9, which fits within an annular groove or recess 10 in the outer end of the nut and is adapted to encircle the outer end of the projection when in its inoperative position. The collar is moved into and out of its seat by a bail 11, which may be connected therewith in any suitable manner, although I prefer to provide the bail with two slots 12, which are located diametrically opposite to each other and tangentially to the outer face of the collar. Inwardly-projecting pins 13 upon the bail are adapted to enter said slots and move the collar back and forth as the bail is swung upon its pivots 14. The bail is pivotally secured to the outer end of the nut, near one side thereof, and has its end preferably cut off angular. A spring 15 is secured at its intermediate portion to the side of the nut, with its free ends projecting out into position to engage with the ends of the bail and hold the bail in its operative and inoperative positions. The bail may be formed in any suitable outline that is rectangular or octagonal to correspond with the shape of the wrench that is to be used for rotating the nut.

In using my improved lock-nut the wheel is placed upon the axle in the ordinary manner and the lock-nut placed upon a projection and rotated to throw its lug behind the shoulders of the projection. The bail, which has been standing out away from the end of the nut in its inoperative position, is then swung inward, which will cause its pins to enter the slots of the collar, and thereby force the wedges down into the grooves of the projection at the sides of the lugs of the nut and lock the nut against backward rotation. When it is desired to remove the wheel, the bail is moved outward from its closed or operative position, which will withdraw the ends of the wedges a sufficient distance to permit of the lugs upon the interior of the nut being rotated from behind the shoulders, when the nut can be easily slipped off the end of the projection. By constructing the lock-nut in this manner the wheel can be removed and replaced much quicker than by the use of the ordinary screw-threaded nut and the nut will be absolutely locked against the removal of the wheel until after the bail has been moved upon its pivots against the action of the springs which engage with its free ends.

Although I have shown what I consider the most desirable form of constructing my improved lock-nut for vehicle-axles, yet I reserve the right to make such changes and alterations therein as will come within the scope of my invention.

Having thus fully described my invention, what I claim as new, and desire to secure by Letters Patent, is—

1. In a lock-nut for vehicles, the combination, with a vehicle-spindle, the outer end of which is provided with a longitudinally-grooved and laterally-recessed tip, of a nut, the inner end of the bore of which is provided with inwardly-extending ribs adapted to slide within the grooves and to be moved laterally into the recesses, a ring at the outer end of the nut, the inner face of which is provided with wedges in position to slide longitudinally within the grooves of the tip, said wedges being of such a length that when the ring and wedges are at their inner position the inner ends of the wedges will engage with the sides of the ribs and prevent their removal from the recesses, and means for moving said ring and wedges, substantially as described.

2. In a lock-nut for vehicles, the combination, with a spindle, the outer end of which is provided with a longitudinally-grooved and laterally-recessed projection, of a nut upon the projection, the inner end of the bore of which is provided with inwardly-projecting ribs adapted to slide within the grooves of the projection and to be moved laterally into the recesses, the outer end of the nut being recessed around the bore, a collar within the recess provided with wedges to fit in the grooves of the projection and having its outer surface provided with diametrically oppositely located tangential slots, a bail pivotally secured to the outer end of the nut, the sides of which are provided with inwardly-extending pins in position to enter said slots, and a spring secured to the nut in position for its free ends to engage with the ends of the bail and lock the same in two positions, substantially as described.

WILLIAM BELFIELD.

Witnesses:
M. L. BRADY,
FRED BELFIELD.